(12) United States Patent
Zeidler

(10) Patent No.: US 6,882,360 B2
(45) Date of Patent: Apr. 19, 2005

(54) METHOD AND APPARATUS FOR DETERMINING A LEVEL OF A VIDEO SIGNAL

(75) Inventor: David E. Zeidler, Warrington, PA (US)

(73) Assignee: General Instrument Corporation, Horsham, PA (US)

( * ) Notice: Subject to any disclaimer, the term of this patent is extended or adjusted under 35 U.S.C. 154(b) by 437 days.

(21) Appl. No.: 09/947,423

(22) Filed: Sep. 5, 2001

(65) Prior Publication Data

US 2003/0048386 A1 Mar. 13, 2003

(51) Int. Cl.[7] ............................................. H04N 17/02
(52) U.S. Cl. ...................... 348/194; 348/180; 348/525; 348/531
(58) Field of Search ................................ 348/468, 537, 348/525, 529, 530, 531, 180, 184, 194, 465; H04N 9/07

(56) References Cited

U.S. PATENT DOCUMENTS

| | | | | | |
|---|---|---|---|---|---|
| 5,053,869 | A | * | 10/1991 | Pletz-Kirsch | ................ 348/531 |
| 5,594,506 | A | * | 1/1997 | Yang | ............................ 348/531 |
| 6,259,485 | B1 | * | 7/2001 | Yamagata | .................... 348/525 |
| 6,271,889 | B1 | * | 8/2001 | Bohm et al. | ................. 348/531 |

* cited by examiner

Primary Examiner—John Miller
Assistant Examiner—Trang U. Tran
(74) Attorney, Agent, or Firm—Akin Gump Strauss Hauer & Feld, LLP

(57) ABSTRACT

A method for estimating a level of a predetermined portion of a video signal comprising the steps of determining a location of the predetermined portion of the video signal, sampling the video signal during the predetermined portion and estimating the level as an average of the samples of the video signal during the predetermined portion.

7 Claims, 3 Drawing Sheets

US 6,882,360 B2

METHOD AND APPARATUS FOR DETERMINING A LEVEL OF A VIDEO SIGNAL

BACKGROUND OF THE INVENTION

1. Field of the Invention

The present invention relates generally to television signal processing and more particularly to a method and apparatus for estimating a level within the blanking interval of a television signal.

2. Background Information

Cable television terminals, commonly referred to as settops, require that analog channel video in the form of a composite video signal, such as the video signal conforming to the standard promulgated by the National Television Systems Committee (NTSC), be digitized and decoded to component form, in order to enable features such as high quality graphics overlay and video scaling in the settop device.

Accurate rendition of the video image requires that the active video level be correctly determined. A preferred way to extract the correct active video level data from the composite video signal is to first determine the video blanking level and to thereafter, reference the active video level to the video blanking level. By first determining the video blanking level, the requirements imposed on the video clamp speed and on direct current level accuracy preceding the video decoder are reduced.

In realistic cable television installations, there can be substantial noise on the video signal caused by noisy channels, or low radio frequency (RF) input level to the settop. Noise occurring during the blanking interval can cause the recovered video blanking level to be inaccurate for a particular line and also, to change from line to line, resulting in inaccurate luminance values or substantial visual artifacts, such as horizontal striping.

A high quality video decoder also incorporates automatic gain control (AGC) to compensate for variations of the amplitude of the composite video signal. When AGC is performed by the video decoder, the decoder measures the difference between the amplitude of a sync tip and the blanking level of the composite video signal and adjusts the amplitude of the composite video signal to maintain a relatively constant value.

Conventionally, the blanking level is determined by averaging the level of the back porch portion of the blanking signal portion of the composite video signal subsequent to removing the color burst signal from the blanking signal by a band reject frequency filter. Alternatively, as is done by some digital techniques, a band reject filter is not used, and the blanking level is determined by sampling the level of the breezeway and/or color back porch portions of the back porch of the blanking interval. The former technique requires a costly filter band reject filter, while the latter technique is sensitive to noise.

BRIEF SUMMARY OF THE INVENTION

Briefly stated, the present invention includes a method for estimating a level of a predetermined portion of a video signal. The method comprises the steps of, determining a location of the predetermined portion of the video signal; sampling the video signal during the predetermined portion; and estimating the level as an average of the samples of the video signal during the predetermined portion.

The present invention further includes an apparatus for estimating the level of a predetermined portion of a video signal. The apparatus comprises: a signal sampler, sampling the video signal; a digitizer, digitizing the samples of the video signal received from the sampler; an averager receiving the digitized samples of the video signal from the digitizer; and a clock providing a clock signal to the sampler, the digitizer and the averager over the predetermined portion. The averager provides the estimate of the level of the video signal as an average of the samples over the predetermined portion of the video signal.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings wherein like numerals denote like elements. For the purpose of illustrating the invention, there are shown in the drawings, an embodiment which is presently preferred. It should be understood, however, that the invention is not limited to the precise arrangement and instrumentality shown.

In the drawings.

DETAILED DESCRIPTION OF THE INVENTION

Figure 1:
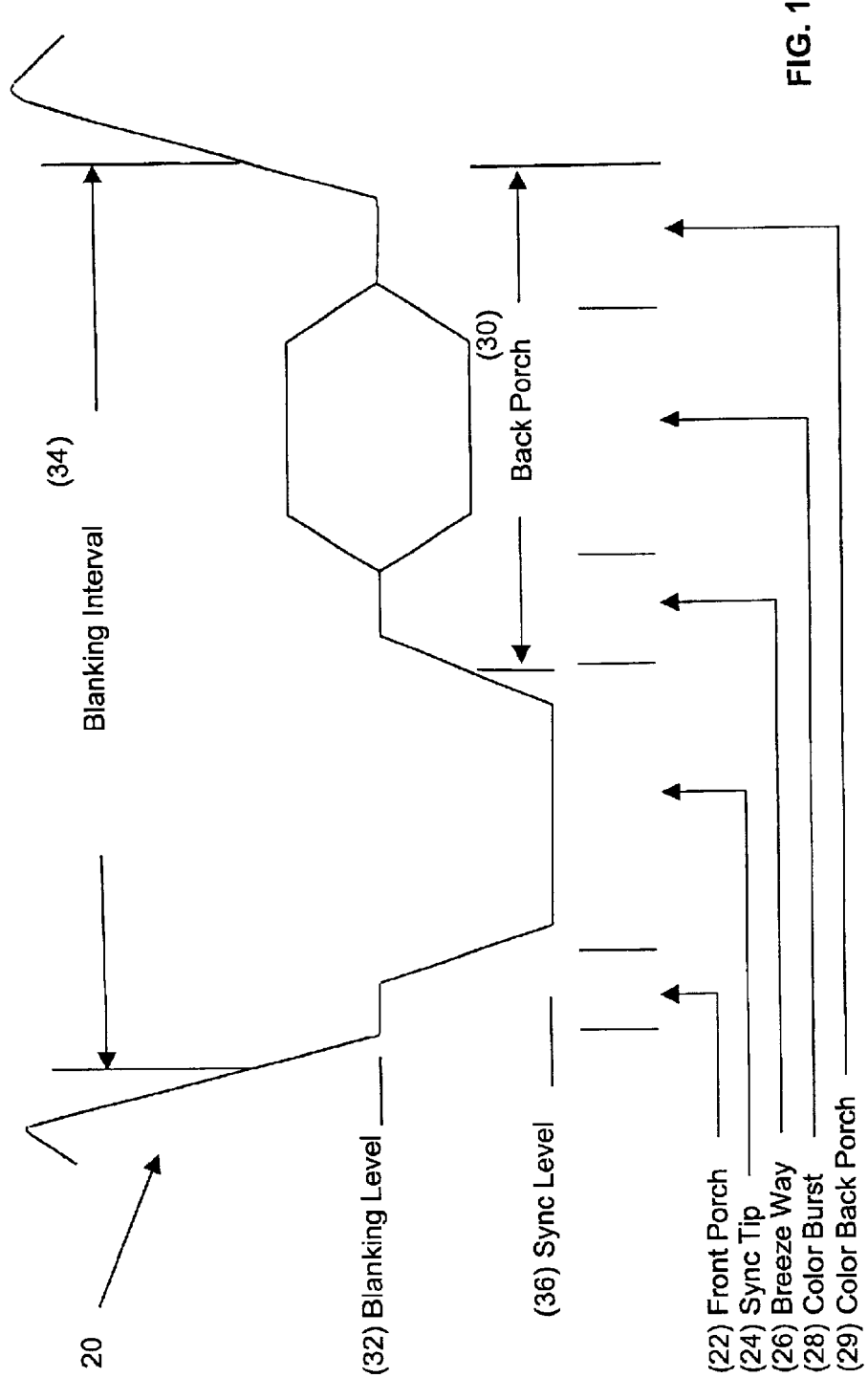
FIG. 1 is a plot of a composite video waveform during a blanking interval.

Referring now to FIG. 1, there is shown a plot of a blanking interval portion 20 of a composite video waveform (referred to hereafter as a "blanking signal"), conforming to the NTSC color television standard. The blanking signal 20 comprises a front porch portion 22, a sync tip portion 24 having a sync level 36, and a back porch portion 30, all of which are included within a blanking interval 34. The back porch 30 includes a breezeway portion 26, a color burst portion 28, and a color back porch portion 29. The color burst 28 comprises approximately nine cycles of a sinusoidal signal at a frequency which is 3.579 . . . MHz. The nominal time duration of each portion of the blanking signal 20 is given in table I.

TABLE I

| Portion of Blanking Interval | Time (usec.) |
| --- | --- |
| Front porch | 1.5 |
| Sync tip | 4.7 |
| Breezeway | 0.6 |
| Color burst | 2.5 |
| Color back porch | 1.6 |
| Back porch | 4.7 |

A blanking level 32 is conventionally characterized by the levels of the "flat" intervals of the front porch 22 and the back porch 30 (excluding the color burst signal) of the blanking signal 20, which intervals ideally, have identical levels. However, due to noise, the levels of the sampled points of the flat intervals within front and the back porches 22, 30 are not absolutely flat nor are they necessarily identical. Thus, it is desirable to average the sampled point levels of the flat intervals of the front and back porches (22, 30) to estimate the blanking level 32.

The accuracy of estimating the blanking level 32 of the composite video signal is increased by maximizing the interval over which the blanking signal is averaged. The "flat" portions of the front and back porches account for 3.7 microseconds of possible integration time. By including the color burst 28, the total averaging time can be increased by about 68%, thus further increasing the accuracy of determining the blanking level 32, providing that the color burst samples do not introduce excessive bias. Experimental data shows that the gain in the accuracy of the blanking level estimate by including the color burst portion of the video signal exceeds any loss in accuracy due to the introduction of bias by the color burst 28.

Figure 2:
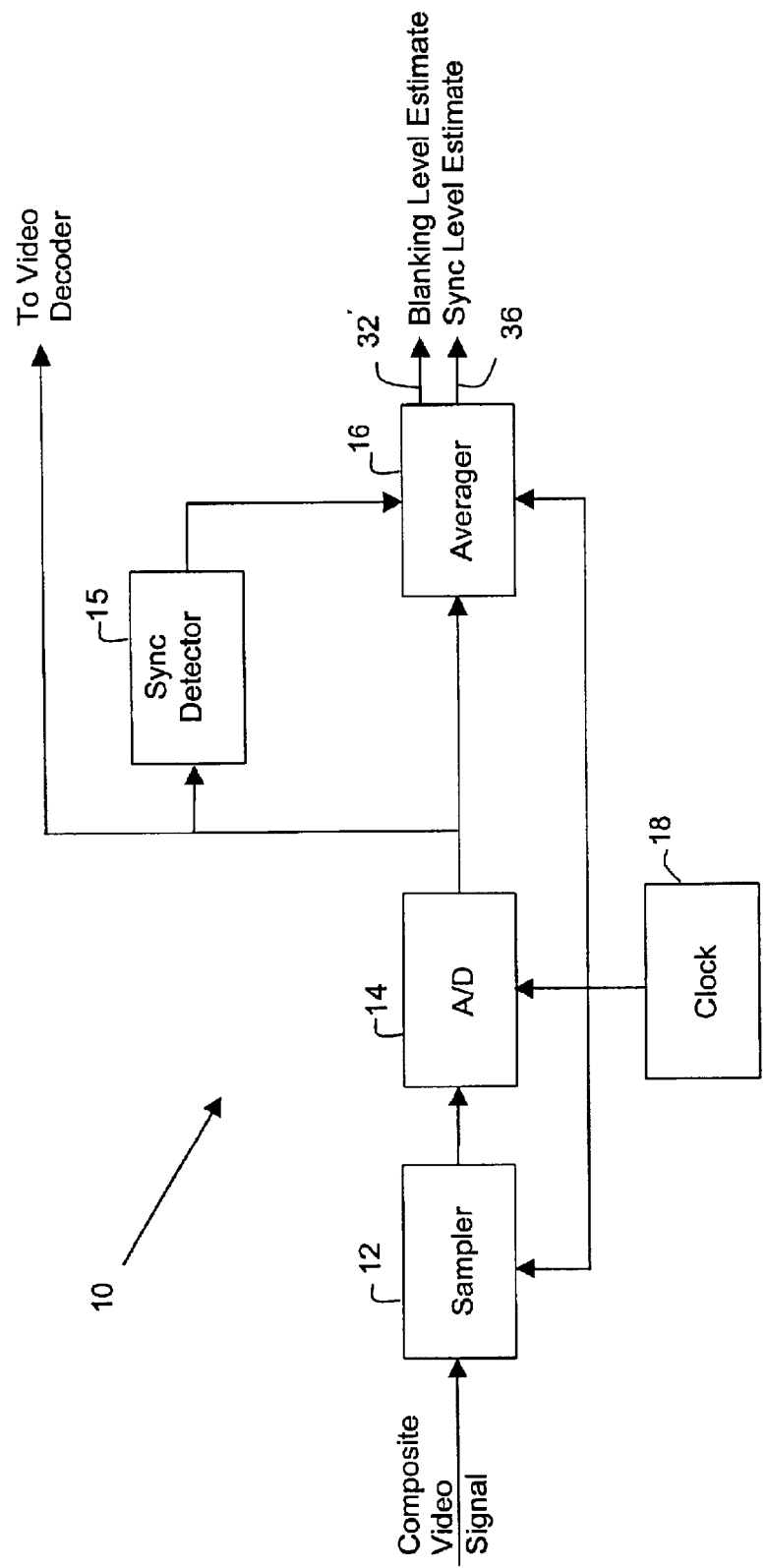
FIG. 2 is a functional block diagram of an apparatus for estimating a level of the video signal during the blanking interval in accordance with a preferred embodiment.

Referring now to FIG. 2 there is shown a functional block diagram of a preferred embodiment of an apparatus 10 for estimating a level of a predetermined portion of the video signal. The apparatus 10 includes a signal sampler 12 which samples the composite video signal at a rate determined by a clock 18. Preferably, the sampler 12 utilizes one or more metal oxide semiconductor (MOS) switches. However, other types of devices, such as semiconductor diodes arranged in a balanced configuration may be used and are within the scope of the invention.

The output of the sampler 12 is in the form of a pulse of voltage and is provided to a digitizer, for digitizing the samples of the composite video signal received from the sampler. In the preferred embodiment, the digitizer is an analog-to-digital converter 14 for converting the pulse of voltage to a digital representation. Preferably, the analog-to-digital converter 14 is a flash converter of a type well known to those skilled in the art, having a resolution of eight bits or greater and operating in time synchronism with the sampler 12. Other types of analog-to-digital converters which provide the necessary resolution at the desired speed, such as successive approximation analog-to-digital converters, may be used and are within the scope of the invention.

The sampler 12 and the analog-to-digital converter 14 are clocked with a clock signal supplied from the clock 18 which provides uniformly distributed clock pulses over the predetermined portion of the video signal. Preferably the clock 18 comprises a stable oscillator, such as a crystal oscillator, operating at a rate of about 27 MHz, which is line locked to the composite video signal by way of a phase locked loop. Alternatively, the clock may operate at about 28.64 MHz, compatible with the Composite Signal Standard, or at about 27 MHz, not line locked. A sample rate of 27 MHz or 28.64 MHz is not critical to the invention, being selected merely to be compatible with clock signals otherwise present in typical cable television terminals.

In the preferred embodiment, the sync tip 24 provides a timing reference for determining the location of the predetermined portion of the video signal. Preferably, a sync detector 15 detects the location of the sync tip 24 by comparing the leading edge of the sync tip 24 with a signal which is counted down from the clock 18 to the horizontal line rate of the video signal. In the preferred embodiment, a digital phase locked oscillator is utilized as the sync detector 15.

The apparatus further includes an averager 16 for receiving the digitized samples of the composite video signal from the analog-to-digital converter 14. The averager 16 includes timing circuits which determine the location of the predetermined portion of the video signal based on the timing reference provided by the sync detector 15. The averager 16 estimates the level of the predetermined portion of the composite video signal by summing the samples over the predetermined portion and scaling relative to the number of samples. Preferably, the average is performed by a scaled summation of the samples over the predetermined portion using a logic such as a digital accumulator and divider. However, the average could be performed, for example, using an arithmetic logic unit of a microprocessor.

In the preferred embodiment, the predetermined portion includes intervals within the front porch and the back porch for estimating the blanking level 32. The averager 16 provides a blanking level estimate 32' of the blanking level 32 of the video signal which is determined by averaging the samples of the video signal during the front porch 22 and the back porch 30 (including the color burst) of the video signal. Accordingly, about 167 samples of the video signal 20 are obtained during each blanking interval compared to only 16 samples provided when sampling the video signal during the breezeway 26 and 43 samples for the color back porch. The predetermined portion also includes an interval within the sync tip 24 for estimating the sync level 36. In the preferred embodiment, the averager 16 also provides a sync level estimate 36' of the sync level 36.

Alternatively, the averager 16 may provide an estimate of the predetermined portion of the video signal as a running average of the samples summed over the front and back porches, and the sync tip, over a predetermined number of horizontal lines of the video signal. Accordingly, the blanking level estimate 32' and/or a sync level estimate 36' may be determined by summing the samples over several horizontal lines and updating the estimate each horizontal line.

Figure 3:
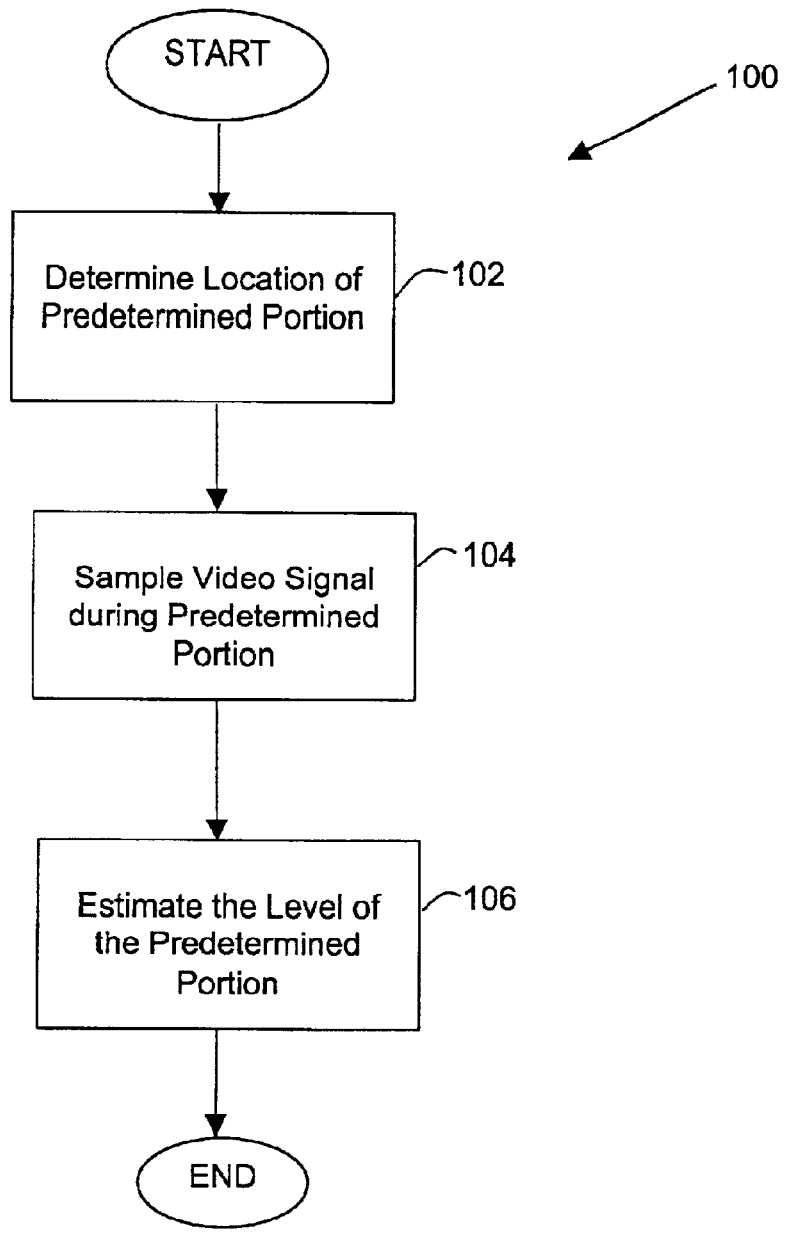
FIG. 3 is a flow diagram of a method for determining the level of the video signal during the blanking interval, using the apparatus shown in FIG. 2.

Referring now to FIG. 3 there is shown a method 100 for estimating a level of a predetermined portion of a video signal comprising the steps of determining a location of the predetermined portion of the video signal 102, sampling the video signal during the predetermined portion 104, and estimating the level as an average of the samples of the video signal during the predetermined portion 106.

In the preferred embodiment, the predetermined portion of the video signal comprises a first predetermined interval within a front porch 22 of the video signal and a second predetermined interval within a back porch 30 of the video signal. Preferably, the second predetermined interval includes the portion of the back porch 30 which includes the color burst 28. The average of the samples collected during foregoing sampling intervals provide an estimate of the blanking level 32'. In the preferred embodiment, the predetermined portion of the video signal also comprises a predetermined interval within the sync tip of the video signal. The average of the samples collected during the foregoing sampling interval provides an estimate of the sync level 36'. Alternatively, the method may provide an estimate of the predetermined portion of the video signal as a running average of the samples over a predetermined number of horizontal lines of the video signal. Accordingly, the blanking level estimate 32' and/or a sync level estimate 36' may be determined by averaging the samples over several horizontal lines and updating the estimate for each horizontal line.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for estimating a level of a predetermined portion of a video signal comprising the steps of:

determining a location of the predetermined portion of the video signal;

sampling the video signal at substantially uniform intervals over the entirety of the predetermined portion; and estimating the level as an average the samples of the video signal during the predetermined portion, wherein the predetermined portion comprises a first predetermined interval within a front porch of the video signal and a second predetermined interval within a back porch of the video signal.

2. The method according to claim 1, wherein the second predetermined interval further includes a color burst.

3. The method according to claim 1, wherein the video signal is sampled at a rate of about 27 MHz.

4. The method according to claim 1, further including estimating the level of the predetermined portion as a running average of the samples over two or more horizontal lines of the video signal.

5. An apparatus for estimating a level of a predetermined portion of a video signal comprising:

a signal sampler, sampling the video signal;

a digitizer, digitizing the samples of the video signal received from the sampler;

an averager receiving the digitized samples of the video signal from the digitizer; and a clock providing a clock signal to the sampler, the digitizer and the averager over the predetermined portion, the averager providing the estimate of the level of the video signal as an average of the samples taken at substantially uniform intervals over the entirety of the predetermined portion, wherein the predetermined portion comprises a portion of a front porch and a portion of a back porch of the video signal.

6. The apparatus according to claim 5, wherein clock has a rate of about 27 MHz.

7. The apparatus according to claim 5, wherein the averager provides the estimate of the level of the predetermined portion of the video signal as a running average of the samples over two or more horizontal lines of the video signal.

* * * * *